July 19, 1938.     P. A. ALLEN ET AL     2,124,512
HOLDER FOR FISHLINE COILS AND THE LIKE
Filed Nov. 7, 1936

INVENTORS:
PAUL A. ALLEN
MARION WOMELDORFF
BY Louis Illmer ATTORNEY.

Patented July 19, 1938

2,124,512

UNITED STATES PATENT OFFICE 2,124,512

HOLDER FOR FISHLINE COILS AND THE LIKE

Paul A. Allen, Cortland, and Marion Womeldorff, Homer, N. Y., assignors to Cortland Line Company, Inc., Cortland, N. Y., a corporation of New York Application November 7, 1936, Serial No. 109,744

5 Claims. (Cl. 242—129)

This invention relates to attractive and inherently simple, two-part spool means for transferring thereon a fish line or the like, and more particularly pertains to an efficient coil display holder that may be cheaply fabricated as a marketing reel for sales exhibit purposes by which to neatly offer a high grade fish line product to the trade.

Our frictionally wedged reel sections may quickly be disengaged by a simple rotative flange twist to fully expose an offered coil and thereby permit a prospective purchaser to gain access to such coil for the purpose of more closely inspecting the quality of such packed goods by personal handling. When mounted in place, a fine fish line may also be conveniently unwound from our sectionalized reel on to a fishing rod reel for active use, and then restored on to such supplementary reel for safe keeping until needed.

The present transfer reel comprises a pair of separable disc-like flanges that are laterally spaced in coaxial relation to receive a coil therebetween. The inner face of one such flange has fixedly attached thereto a spacer annulus whose bore is preferably given an elliptical shape, and the other flange comprises a reversely disposed mated plug of a like perimetric contour adapted to be freely telescoped into such elliptical shape when said flanges assume certain radial registry. A partial turn or simple axial twist of one with respect to the other flange herein serves to spacedly retain the flanges without resort to threads, snap fastener clips or the like mechanism. An opposed rotary movement allows such mated reel sections to be readily parted and thereby bodily demount the assembled fish line coil. The center region of said reel may be apertured to spin the same around a common flange axis.

The object of our invention is to provide for a neat and simple coil marketing reel of the indicated character that may be economically fabricated at low first cost to permit a transfer reel of this kind to be furnished with each sold coil without materially increasing the factory cost of such combined unit.

Embodied herein are also other structural features organized to promote the end in view, all of which will hereinafter be more explicitly set forth. Reference is had to the accompanying one sheet of drawings which are illustrative of different embodiments of our invention, and in which drawing.

Figure 3:
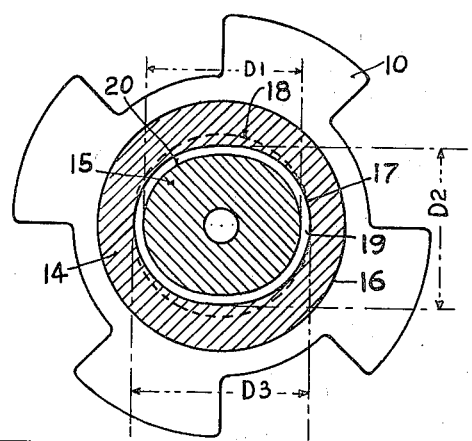
Fig. 3 depicts a cross-section taken along 3—3 of Fig. 2.
Figure 6:
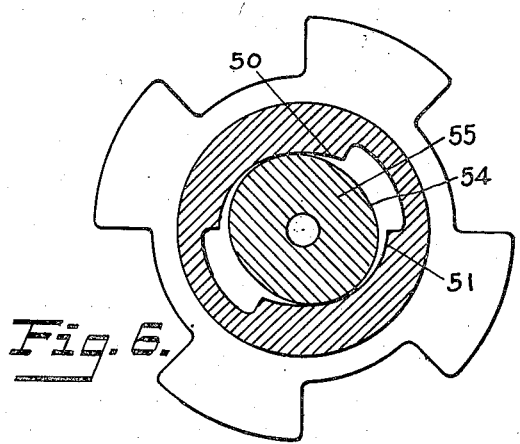

Fig. 6 corresponds to Fig. 3 but shows the use of a recessed bore structure providing for complementary jaws.

Figure 1:
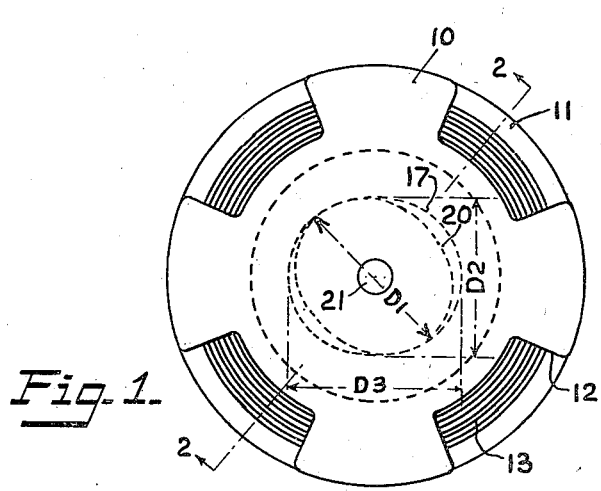
Fig. 1 represents a flange end view of our two-part holder having a coil of fish line mounted thereon.
Figure 2:
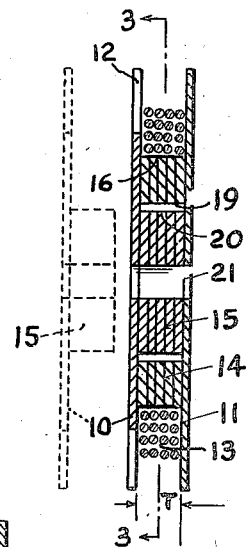
Fig. 2 shows a cross-section of such assembly taken along 2—2 of Fig. 1.

Referring first to Figs. 1 to 3, this preferred style of reel comprises fore and aft disc-like flanges 10 and 11, of which the perimeter of one such flange may be radially indented as at 12 to better exhibit the character of the mounted fish line coil 13 and to provide for spanner-like wings by which to firmly grip the indented disc perimeter. Such flanges may be stamped up from cardboard, celluloid or any other suitable sheet material. The exposed outer flange faces are adapted to have advertising script printed thereon or have a label attached thereto listing the make, style and size of the mounted coil and also giving instructions regarding the transfer of such fish line to a regular reel.

The diametral size of these flanges may be kept alike as shown and have their perimeters concentrically disposed. The telescope flange spacer means as used herein, may as one component thereof comprise a relatively flat sided annulus 14 that may be made up from a stack of apertured cardboards fixedly cemented to the inner face of one such flange coincident with the axis thereof, while the other mated component or eccentric plug 15 may be similarly laminated and bodily cemented to the corresponding face of the other flange. The respective mated telescopic components 14 and 15 may also be cast as solid blocks out of bakelite, celluloid or the like plastic material.

As detailed in Fig. 3, the outer perimeter 16 of such flange spacer annulus is preferably made circular while the substantially smooth borelike hole or cavity 17 thereof is herein given a noncircular or the like elliptical superficial contour having a major diameter D3 and a minor diameter D2 which are differently sized to approximately the extent indicated by a dotted reference circle 18. The perimeter 20 of our eccentric plug component 15 is given a similar superficial shape but allowing for radial play or a restricted clearance gap 19, such that the dimension of the major plug diameter D1 will fall intermediate the differential bore sizes D2 and D3. These dimensions are preferably so selected that a blanking die for said annulus may simultaneously strike up a corresponding plug lamina. A centralized through hole 21 is adapted to receive a pencil or the like axle to facilitate coil transfer.

Both mated spacer components 14 and 15 are preferably built up to the distance designated T, as in Fig. 2 to provide for a corresponding lateral spacing between the inner flange faces into which to mount the coil 13. It will be obvious however that the same result is had when the outer annulus 14 alone is built up to the full thickness T without need of likewise extending the plug 15. In the manufacture of fish line products, each coil is usually delivered to the packing room with one or more bands of string tied therearound to restrain the free ends of the mounted coil. Where desired, such coil may also be loosely wound directly upon our assembled reel.

When the flange 10 together with its plug 15 are bodily withdrawn from the flange 11 and its annulus 14 into the dotted Fig. 2 position, then the coil 13 may be freely slipped on or off the circular perimeter 16. By telescopically entering the plug perimeter 20 into registry with the bore 17 in the Fig. 3 manner and allowing for adequate clearance play therebetween, then the flange 11 assumes an assembled relationship wherein the projecting outermost face of the annulus 14 abuts the companion flange 10 as in Fig. 2. By giving the wings of the flange 10 an axial twist with respect to its companion flange 11, this will carry the major plug diameter D1 into wedged tangential engagement with the circumscribing eccentric bore 17 in the fashion schematically represented in Fig. 1. During such rotative movement, the flanges remain fixedly spaced at the distance T and the endless gap 19 may become progressively reduced to comprise two parted semi-circular constituents, as shown. The engaging surfaces 17 and 20 may or may not be conically tapered to provide for a slight axial draft. A reversal of flange movement re-establishes the initial clearance 19 and permits of again freely separating the released flanges 10 and 11.

It will be obvious that the same underlying wedging principle may be embodied without necessarily relying upon two complete elliptical perimeters such as 17 and 20; for instance, such non-circular bore may be oppositely recessed to constitute complementary jaw faces 50 and 51 as in Fig. 6, of which the respective arcuate face components are given a finite profile length to bring about a like result. Said jaws jointly cooperate with the superficial contour 54 of the plug section 55. The contacting cardboard edges yield sufficiently to set up an effective frictional grip or wedged engagement that remains intact without the need of impressing screw threads or the life groove formation in such contacting surfaces.

Figure 4:
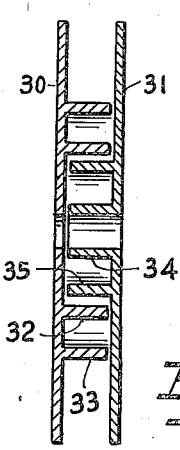
Figs. 4 and 5 are similar to the Fig. 2 cross-section but respectively disclose certain modifications in structure thereover.

As a modification, attention is directed to Fig. 4. Here the companion flanges 30 and 31 are respectively provided with pairs of laterally projecting endless walls or finlike ribs having a hollowed spacing therebetween to reduce the weight of the previously described reel structure and provide a storage pocket for hooks or the like fish line accessories. The flanges of this alternative design are especially suited to be separately cast from bakelite or the like plastic. The integral perpendicular ribs 32 and 33 together constitute a hublike spacer annulus corresponding in purpose to the aforesaid solid telescopic component 14, while the circumscribed ribs 34 and 35 together form the equivalent of the built-up plug component designated as 15. These ribs cooperatively function in a manner substantially identical to the Figs. 1 to 3 disclosures.

Figure 5:
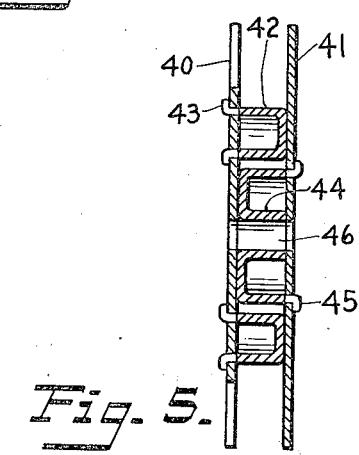

A further alternative is represented in Fig. 5 where the inner faces of the companion flanges 40 and 41 are respectively equipped with similar telescopic spacer components. In this design, the annulus 42 may be stamped up from sheet metal or the like material into a cross-sectionally U-shaped profile of which the mated leg edges are provided with plural prongs 43 adapted to cleat the flange 40. The hollowed plug component 44 is similarly shaped up to include the prongs 45 that engage the other flange 41. A spindle receiving hole 46 may also be provided for. Should the attached chambered components 42 and 44 be fabricated from cardboard, celluloid or the like sheet material, internally disposed lips may be substituted for the prongs and these attached to their respective flanges by the use of a suitable adhesive.

All the cited disclosures are kept free from interlocking clips, springs, screw threads or the like structural complications. Our reel design is pleasing in external appearance and thereby affords a neat packed trim for a coiled strand that of itself promotes the sale thereof. Such combined marketing and line storage reel not only visibly reveals the quality of such goods but may be labeled as to length, grade and like contents.

It is believed that the foregoing rather explicit disclosures make apparent to those skilled in this art, the advantages afforded by our simple and relatively cheap transfer reel. It is to be understood that certain changes in the illustrative embodiments thereof may be resorted to in attaining a like result, all without departing from the spirit and scope of our invention heretofore described and more particularly defined in the appended claims.

We claim:

1. A two-part transfer reel comprising a pair of separable flanges mounted for relative rotation about an axis, and mated telescopic spacer means interposed to retain said flanges in a definite laterally spaced relationship, said means comprising an annulus fixedly adjoined to the inner face of one such flange and having a substantially smooth non-circular bore disposed about said axis and which means further comprise an eccentric plug fixedly carried by and extending laterally from the inner face of the other flange with the eccentric superficial contour of the plug cooperatively shaped around said axis to freely telescope within the confines of said non-circular bore and initially provide for a radial clearance gap between the plug and annulus when telescoped, said gap being progressively reduced when said flanges are manually rotated relative to each other while the flanges remain definitely spaced and thereby bringing said superficial plug contour into wedged tangential engagement with the non-circular bore and which gap is reestablished when said flanges are reversely rotated.

2. A two-part transfer reel comprising a pair of separable flanges mounted for relative rotation about a common axis, and mated telescopic spacer means interposed to retain said flanges in laterally spaced relation, said means being provided with a built-up laminated annular component fixedly carried by and extending laterally from the inner face of one such flange and having a non-circular bore circumscribing said axis and which means are further provided with a built-up laminated plug component fixedly carried by and extending laterally from the inner face of the other flange and which plug has an eccentric superficial contour that is telescoped within and cooperatively shaped with respect to the aforesaid bore to initially provide for a radial clearance gap between the telescoped components, said gap being progressively reduced when said flanges are manually rotated relative to each other to bring said plug contour into wedged tangential engagement with said non-circular bore.

3. A two-part transfer reel comprising a pair of separable flanges mounted for relative rotation about a common axis, and mated spacer means interposed to retain said flanges in a definite laterally spaced relationship, said means being provided with a hollowed annulus fixedly carried by and laterally projecting from the inner face of one such flange and having a substantially smooth non-circular bore disposed around said axis and which means are further provided with a hollowed plug component fixedly carried by and laterally projecting from the inner face of the other flange and which plug has an eccentric superficial contour that is telescoped within and cooperatively shaped with respect to the aforesaid bore to initially provide for a radial clearance gap between the telescoped plug and annulus, said gap being progressively reduced when said flanges are manually rotated relative to each other while the flanges remain definitely spaced and thereby bringing said plug contour into wedged tangential engagement with said bore.

4. A two-part transfer reel comprising a pair of separable flanges mounted for relative rotation about an axis, each such flange having an endless integral rib that is respectively interposed between said flanges in telescopic relation about said axis, the inner surface of the outer rib being disposed to provide for a non-circular bore and the outer surface of the inner rib serving as an eccentric agency having a superficial exterior contour shaped to tangentially engage and frictionally wedge within the aforesaid bore when the flanges are manually rotated relative to each other, said bore and the superficial contour of said agency being initially spaced along the telescoped length thereof prior to such flange rotation.

5. A two-part transfer reel comprising a pair of separable flanges mounted for relative rotation about an axis, and mated telescopic spacer means interposed to retain said flanges in a definite laterally spaced relationship, said means comprising an annulus carried by and laterally projecting from the inner face of one such flange and having a circular outer perimeter that circumscribes said axis and the inner perimeter of which annulus includes a non-circular jaw face portion having a component length arranged eccentrically with respect to such outer perimeter, said spacer means further comprising a plug fixedly carried by and laterally projecting from the inner surface of the other flange and having a superficial contour that is eccentrically shaped with respect to said axis to telescope within the aforesaid inner perimeter, the eccentrically shaped plug contour being brought into wedged tangential engagement with the jaw face portion of the annulus when said flanges are manually rotated relative to each other.

PAUL A. ALLEN.
MARION WOMELDORFF.